United States Patent [19]

Stewart

[11] Patent Number: 5,242,703

[45] Date of Patent: Sep. 7, 1993

[54] METHOD OF COOKING FOOD IN A GAS GRILL

[76] Inventor: James M. Stewart, Box 6161, Station B, Greenville, S.C. 29606

[21] Appl. No.: 757,656

[22] Filed: Sep. 6, 1991

Related U.S. Application Data

[63] Continuation-in-part of Ser. No. 471,954, Jan. 26, 1990, abandoned, which is a continuation-in-part of Ser. No. 375,194, Jun. 30, 1989, abandoned.

[51] Int. Cl.⁵ ............................................. A23L 1/00
[52] U.S. Cl. .................................... 426/523; 126/25 B
[58] Field of Search ....................... 426/523; 126/25 B

[56] References Cited

U.S. PATENT DOCUMENTS

| | | |
|---|---|---|
| 3,033,191 | 5/1962 | Bonadiman .................. 126/25 B |
| 4,422,435 | 12/1983 | Spell .............................. 126/25 B |
| 4,706,643 | 11/1987 | Tyson ........................... 126/25 B |

Primary Examiner—George Yeung
Attorney, Agent, or Firm—Hardaway Law Firm

[57] ABSTRACT

A barbecue cooker for cooking meats comprising a cooker bowl, a closure for said bowl, means for supporting food in the bowl, one or more heat sources and heat emitters supported within the cavity of the cooker bowl adjacent the heat sources. Heat and temperature are defined whereby maximum efficiency and food flavor are obtained.

1 Claim, 4 Drawing Sheets

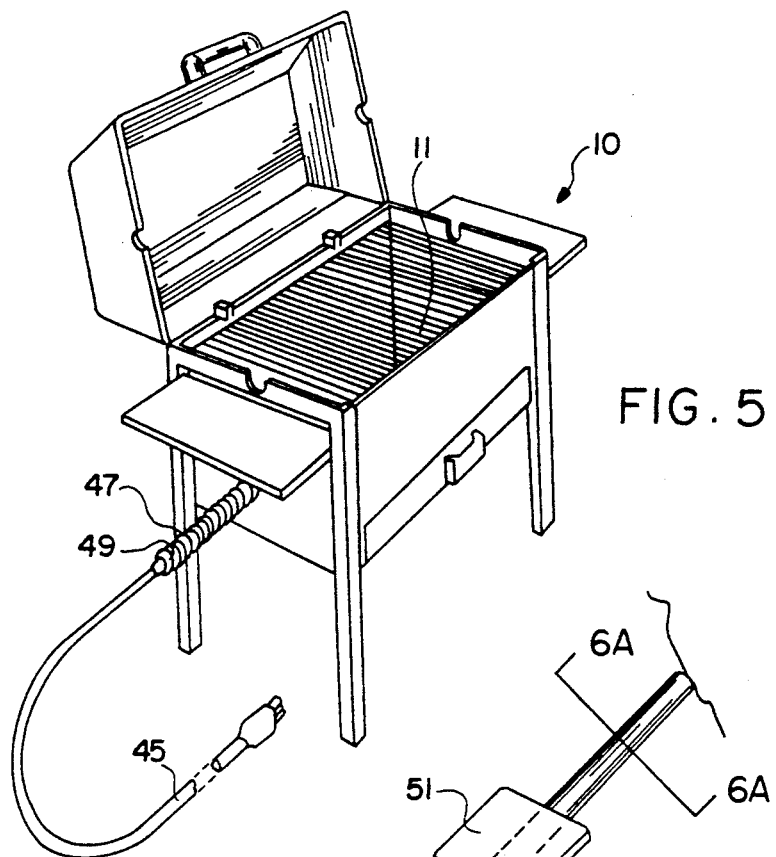
FIG. 5
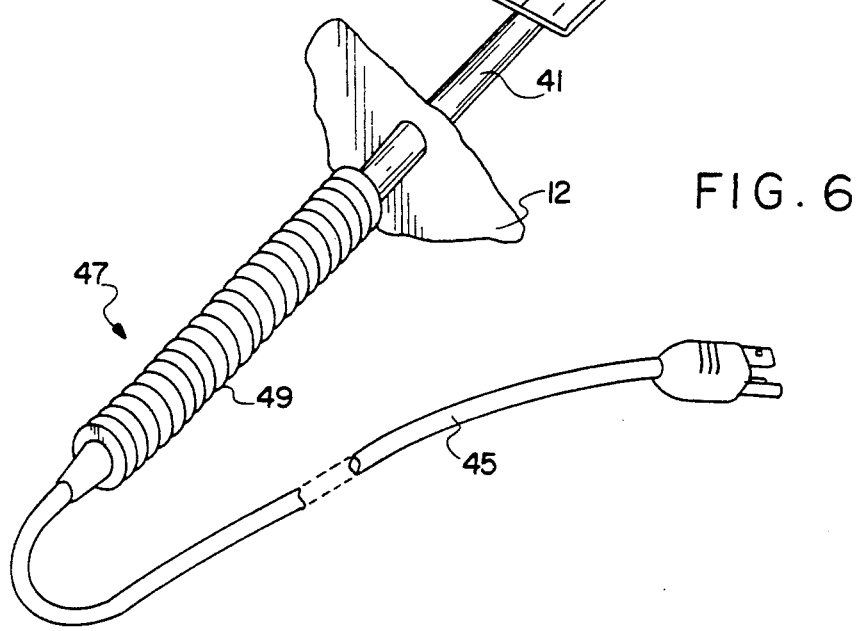
FIG. 6
FIG. 6A
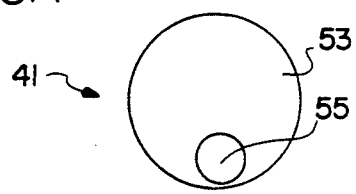

METHOD OF COOKING FOOD IN A GAS GRILL

CROSS-REFERENCE TO RELATED APPLICATIONS

This application is a continuation-in-part of application Ser. No. 07/471,954, filed Jan. 26, 1990, now abandoned, which was a continuation-in-part of application Ser. No. 07/375,194 which was filed on Jun. 30, 1989, now abandoned.

BACKGROUND OF THE INVENTION

This invention relates generally to barbecue cookers and, more particularly, to a barbecue cooker that provides optimum results in slow cooking by duplicating the flavor and tenderness of a wood-fired, pit cooker, as well as providing for faster cooking of other foods.

A variety of cooking devices have been developed over recent history in an effort to make cooking more efficient. Radiation of a lower frequency (long wave) is known to penetrate organic matter more easily than radiation of a higher frequency. Therefore, low frequency infrared can be used to cook meats without charring them. One device taking advantage of this phenomenon is shown in U.S. Pat. No. 3,003,409. Similar devices are shown by U.S. Pat. Nos. 3,682,643 and 3,820,525.

Other cooking devices have been developed with an eye toward enhancing the flavor of food as well as the enjoyment of the user. Traditional charcoal barbecue cookers, e.g. U.S. Pat. No. 4,062,340, are within this category.

U.S. Pat. No. 3,688,685 describes a large, commercial-type barbecue cooker which cooks with electric heating elements. A similar device intended to be used with smaller quantities of food is shown by U.S. Pat. No. 4,663,517.

U.S. Pat. Nos. 4,677,964 and 4,727,853 disclose barbecue cookers using gas as a source of heat.

U.S. Pat. No. 4,321,857 discloses an infrared gas grill for cooking items, but has no provision for balancing radiation and heat.

While the above exemplifies the multitude of cooking devices, no single device has filled the desired pit-cooked flavor and enjoyment, ease of operation and infrared effectiveness.

SUMMARY OF THE INVENTION

It is thus an object of this invention to provide a novel barbecue cooker.

It is another object of this invention to provide a novel barbecue cooker that slow cooks meats to perfection through a proper combination of heat, temperature and distance between the heat source and the food.

It is a further object of this invention to provide such a novel barbecue cooker that can also be used to cook foods fast.

These objects, as well as others, are accomplished by a barbecue cooker comprising a cooker bowl, an enclosure for the bowl, means within the bowl for supporting food, one or more heat sources within the bowl and heat emitters supported within the bowl adjacent the heat sources. Additionally, means are provided to support pieces of wood within the cooker to char the wood and thereby enhance the flavor.

BRIEF DESCRIPTION OF THE DRAWINGS

FIG. 5 of the drawings is a perspective view of a barbecue cooker with an electric heat source according to this invention.

FIG. 6 of the drawings is a perspective fragmentary view of the electric heat source of FIG. 5.

FIG. 6A is a cross section view along line 6A—6A of FIG. 6.

DETAILED DESCRIPTION

In accordance with this invention, it has been found that cooking of meats can be accomplished with the most desirable flavor characteristics and a minimum of effort. Heat, which determines temperature within a cooker, and temperature, which determines the wavelength of infrared radiation, have been determined and the cooker of this invention permanently fixes these variables to remove the possibility for error. While this is the primary advantage of the present invention, many other advantages and features will become apparent from a reading of the following description given with reference to the various figures of drawings.

Figure 1:
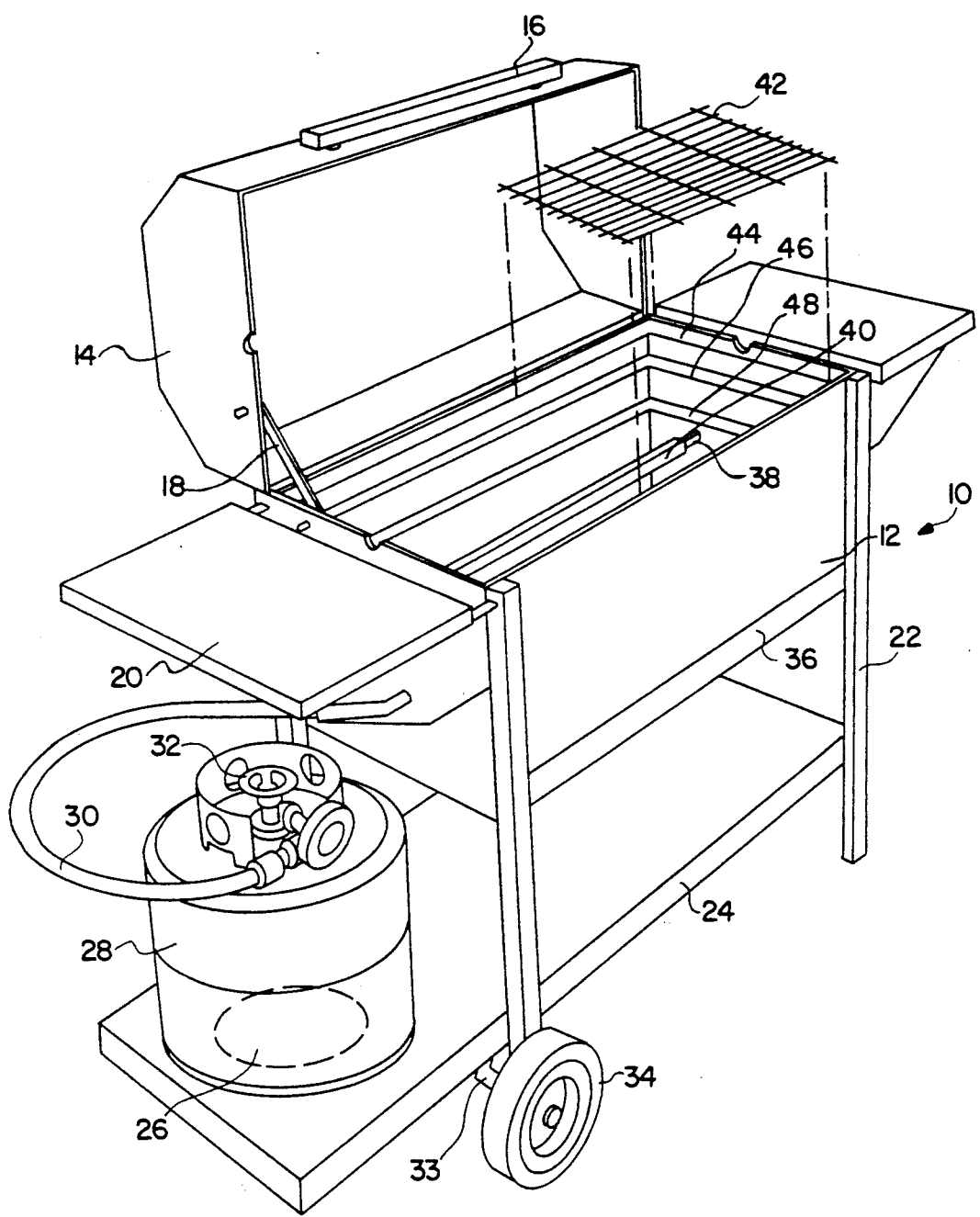
FIG. 1 of the drawings is a perspective view of a barbecue cooker constructed in accordance with this invention.

FIG. 1 shows a barbecue cooker 10 constructed in accordance with the present invention. The cooker 10 generally comprises a cooker bowl 12 and an enclosure for the cooker bowl such as hinged lid 14. Hinged lid 14 includes a wooden handle 16, and a prop 18 to maintain hinged lid 14 in an open position. Cooker 10 may be provided with utility sideboards 20, which preferably are a wooden table. Cooker 10 is supported by legs 22 which preferably are connected to a bottom shelf 24. In accordance with this invention, bottom shelf 24 defines a hole 26, seen in phantom, which is adapted to receive a portion of a gas container, shown as propane tank 28. The heat source comprises propane tank 28 which has a gas line 30 extending therefrom. Communicating with tank 28 at an end opposite hole 26 is an on/off valve 32. The heat source could also be electric according to this invention, as in FIG. 2.

An axle 33 and wheels 34 are shown attached to one pair of legs 22 in order to enable cooker 10 to easily be moved.

Figure 2:
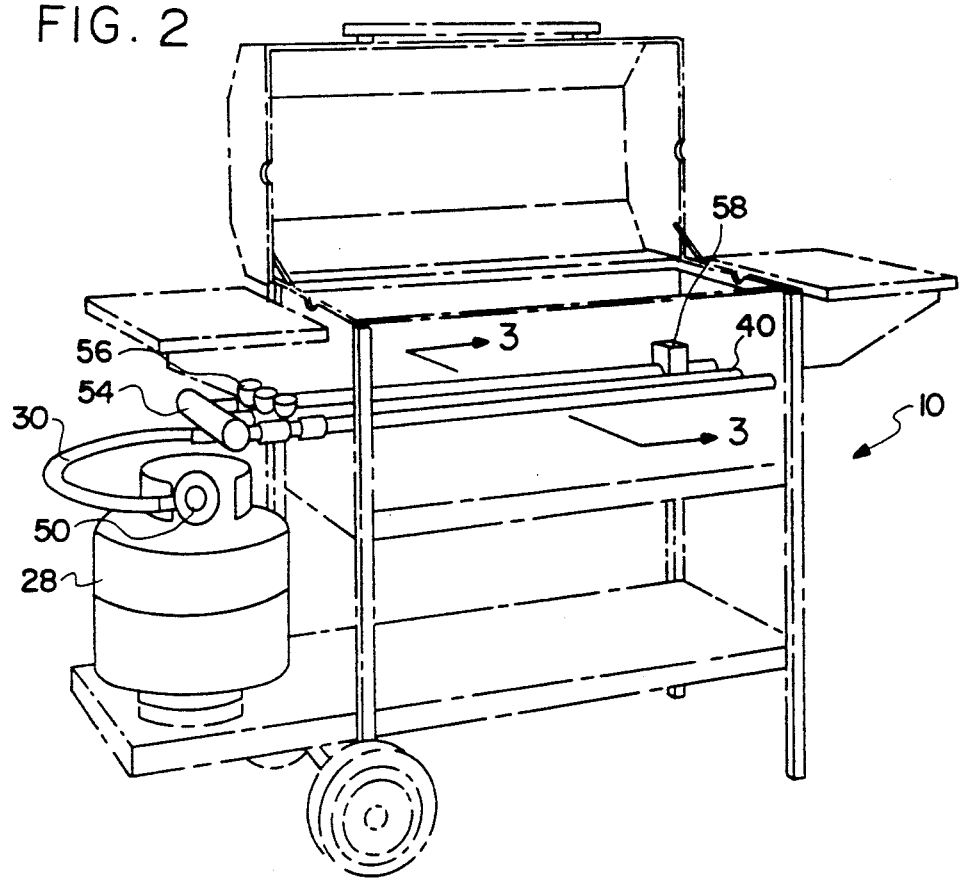
FIG. 2 of the drawings is a partial view in phantom of a barbecue cooker of FIG. 1.
Figure 3:
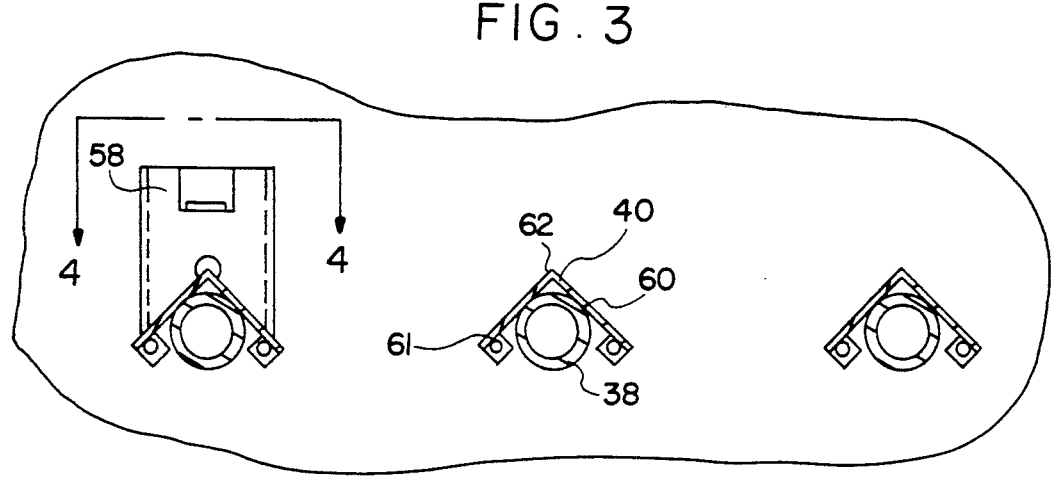
FIG. 3 of the drawings is a cross section view drawn along line 3—3 of FIG. 2.

Cooker 10 may include a drawer 36 or some other means for removing fat and/or ashes. Extending through cooker 10 are one or more gas tubes 38, with heat emitters 40 adjacent and above tubes 38 as best illustrated in FIGS. 2 and 3. Cooking grate 42 is shown out of position, but can be placed on various support levels 44, 46, or 48 within cooker 10.

FIG. 2 is a construction view in partial phantom of cooker 10 with gas as a heat source. FIG. 2 best illustrates the preferred structure of heat emitters 40 positioned above and adjacent to tubes 38. As in FIG. 1, the heat source for cooker 10 is propane tank 28, which includes gas regulator 50. Tank 28 supplies gas by way of gas line 30, manifold 54, and stopcocks 56 to gas tubes 38. In the preferred embodiment, there are three gas tubes 38, each spaced equally apart from one another and extending lengthwise through cooker 10, and each having a heat emitter 40 positioned above it. A platform 58, here comprising a metallic box, functions as a means of support for wood or other flavor enhancers. The wood will slowly char, helping to give the food a smoked taste.

Any heated body gives off infrared radiation. All cookers, therefore, use infrared. The frequency of the infrared is dependent upon the temperature. A charcoal fire or heated lava rock gives of mixed frequency infrared. The heated bodies also heat air by convection, which is sensible heat. Sensible heat and radiant heat are different and are to be considered separately.

FIG. 3 is a cross section view along line 3—3 of FIG. 2. As illustrated, three gas tubes 38 exist in the preferred embodiment. Each gas tube 38 has a heat emitter 40 positioned above it. Heat emitters 40 are shown as comprising two rectangular metal plates 60 which are joined longitudinally at 62. The plates 60 are preferably constructed of stainless steel. The plates are in an angled position to one another above gas tubes 38. This configuration enables heat emitters 40 to absorb heat from gas tubes 38 and emit infrared to cook food placed in the cooker. Air within the cooker is also heated by convection. In the preferred embodiment, the angle between plates 60 is between 90° and 105° This configuration allows plates 60 to be flat enough to radiate heat toward the food to be cooked and steep enough to allow most fat to run off. This configuration also prevents food drippings from coming into contact with flames provided by gas tubes 38, thereby inherently providing protection from flare-ups which are common with conventional gas grills. Any remaining food drippings that do not drain off will quickly vaporize. The vapors will surround the food and contribute to the desirable "outdoor flavor". Platform 58 is shown on one of the heat emitters 40.

Heat emitters 40 are shown in FIG. 3 with the plates 60 both extending generally around gas tubes 38. It is envisioned according to this invention that heat emitters 40 can also be positioned above gas tubes 38 such that the bottoms 61 of heat emitters 40 are both slightly above gas tubes 38. It is this configuration that has been found to work best according to this invention. After gas is provided in the amount required to heat the air within the cooker to its desired temperature, the surface areas of the plates 60 of heat emitters 40 and their placement with respect to gas tubes 38 determine the temperature of heat emitters 40. Modifications of an inverted "U" design can also be used.

With the configuration of heat emitters 40 positioned above gas tubes 38 according to this invention, it is virtually impossible to over-cook or dry-out food.

Figure 4:
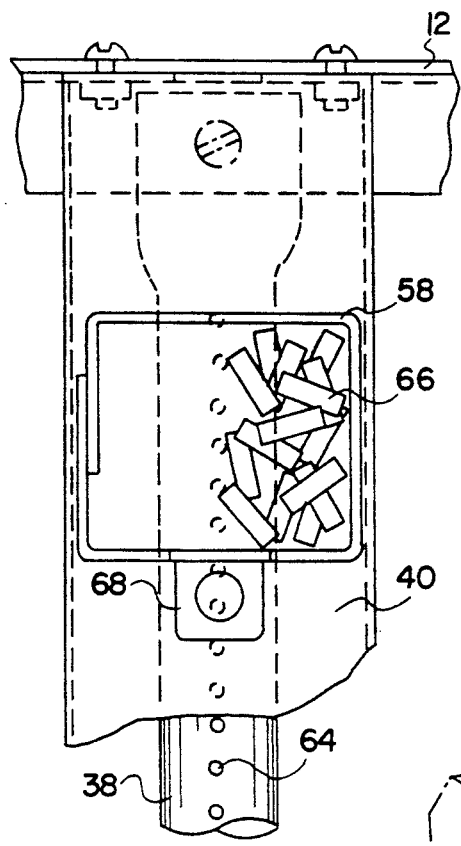
FIG. 4 of the drawings is a fragmentary plan view taken along line 4—4 of FIG. 3.

FIG. 4 is a fragmentary plan view taken along line 4—4 of FIG. 3 showing a gas pipe 38 in accordance with this invention. As partially shown, gas pipe 38 is attached to cooker bowl 12. Gas pipe 38 has aligned perforations 64 in its top for emission of flames therethrough. There are no perforations on the sides of gas tube 38 because such perforations tend to cause flames to wrap around heat emitter 40. Heat emitter 40 is positioned above gas tube 38. Platform 58 is shown as comprising a metallic box and is positioned immediately above heat emitter 40. Platform 58 contains wood chips 66 which are heated by heat emitter 40 and slowly char, helping to give food cooked in cooker 10 a smoked taste. Platform 58 also includes a handle 68 which can be used to place and remove platform 58.

FIG. 5 is a perspective view of a barbecue cooker with a single electric heat source according to this invention. The cooker 10 is shown as substantially similar to FIG. 1 except the heat source is a single electric heat source 41. Energy to electric heat source 41 is supplied by electricity through power cord 45. A heater extension 47 with shielding means 49 is provided for a temperature drop between the actual heating element of heat source 41 and the power cord 45. In this embodiment of cooker 10, only a single heat source is shown extending through the cooker, although more than one are possible.

FIG. 6 is a perspective fragmentary view of the electric heat source 41 of FIG. 5. The wall of the cooker bowl 12 defines an opening for electric heat source 41. Power cord 45 and heater extension 47 are also shown. Heater extension 47 includes shielding means 49 which reduces chances of personal injury due to burns.

As with gas, heat is supplied to maintain "oven" temperature and the surface area of the emitter determines its temperature (wave length).

FIG. 6A is a cross section view along line 6A—6A of FIG. 6. As illustrated, heat source 41 comprises heat emitter 53 and has heating element 55 positioned within.

Figure 7:
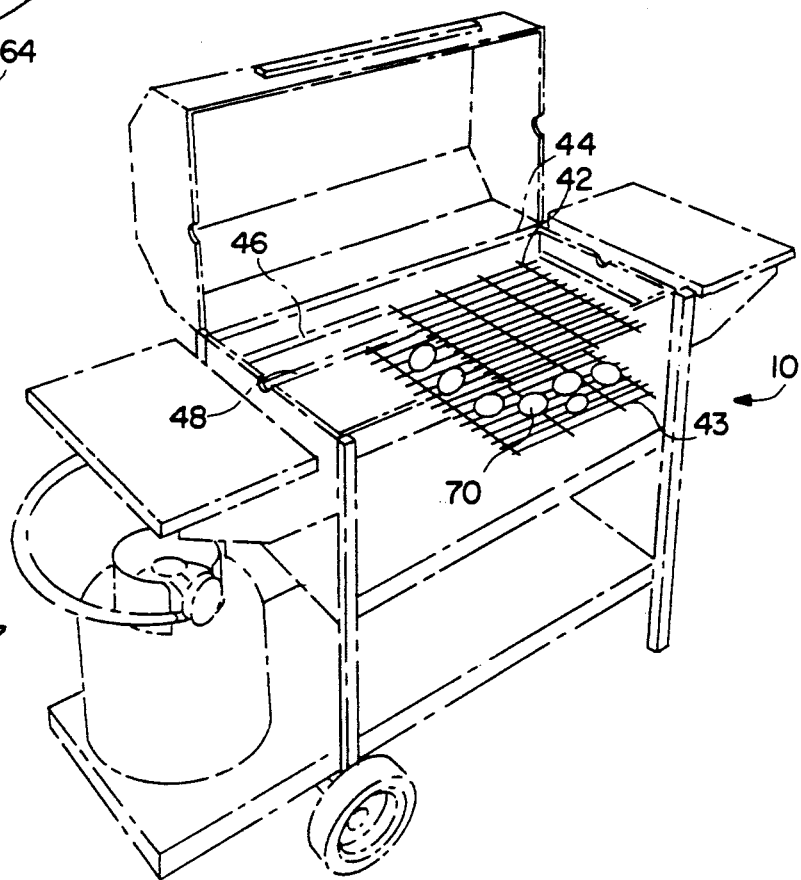
FIG. 7 of the drawings is a perspective view of a barbecue cooker illustrating a cooking grate and a fire grate for charcoal cooking in accordance with this invention.

FIG. 7 is a perspective view of barbecue cooker 10 illustrating cooking grate 42 and fire grate 43 being used for charcoal cooking according to this invention. Cooking grate 42 can be positioned on either of three support levels 44, 46, or 48 in the preferred embodiment of this invention. These various possible positions for cooking grate 42 enable the distance between gas tubes 38 (and heat emitters 40, seen in FIG. 3) and food placed on cooking grate 42 to be easily adjusted according to the distance desired. In the preferred embodiment, one or more grates such as cooking grate 42 may be used with cooker 10 since there are different levels upon which cooking grate 42 can be placed. Also, it is desirable that cooking grate 42 be slightly less than one-half the length of the cooker 10 so that two such grates can be used simultaneously on the same level. This size of cooking grate 42 also enables the wood chips in the platform to be easily inserted or removed by simply sliding one of the cooking grates 42.

Many persons prefer meats cooked over a hot charcoal fire. According to this invention, another grate, such as fire grate 43, seen in partial phantom in FIG. 7, can be on a low support level in cooker 10, and charcoal 70 can be placed thereon. Gas tubes 38 (seen in FIG. 2) can be used to ignite charcoal 70 and cooking grate 42 can be placed on a higher support level above the charcoal. Once the charcoal 70 shows small amounts of color, the gas should be turned off because charcoal will not burn properly in the oxygen starved atmosphere above burning gas. Only when the heat source is gas can it be used to ignite the charcoal. When the heat source is electric, the cooker can still be used with charcoal, but the heat source cannot be used to ignite the charcoal. The heat emitters, whether the heat source is gas or electric, need no protection from the ash and can merely be brushed off after the charcoal cooking. In this manner, cooker 10 can be used as a normal charcoal grill.

Cooker 10 can be used as a regular grill or as a pit-cooker. Two or more heat sources, gas or electric, are normally used for regular grilling, while a single heat source is used for pit-cooking. When used as a pit-cooker, it is preferred that an ambient temperature of 225° F. be maintained in the cooker with the lid closed. A temperature much less than this will result in excessively long cooking times and even dangerous bacterial growth. A temperature much above 225° F. causes food to dry out. The temperature of the heat emitters 40 should be approximately 800° F. to 1200° F., with 1000° F. being the optimum temperature at the longitudinal axes 62 of the heat emitters 40. Below this range of temperatures, meat tends to develop a watery consistency. Above this range of temperatures, meat tends to brown too quickly, tends to dry out, will not release optimum fat, and perhaps will burn before being fully cooked. Pit cooking by definition is a long cooking cycle whereby collagen (fibrous connective tissue) breaks down to produce fork-tender meat. Small areas of the heat emitters 40 at a higher temperature cause no problem. Even small areas at a temperature lower than 500° F. to 600° F. may cause meat juices which drip upon the heat emitters 40 to smolder and produce ill-tasting smoke, which smoke can ruin the flavor of the meat.

Long-wave infrared emissions penetrate food but do not seal it early in the cooking cycle, thereby allowing almost all fat to be rendered from the meat before cooking is complete. Late in the cooking cycle, the outside of food browns and becomes crisp. The inside becomes fork-tender and remains moist. Even substantial overcooking does not dry out the meat.

Not all foods need a long, tenderizing pit-cooking cycle. To this end, multiple heat emitters can be positioned side-by-side in a preferred embodiment of this invention, as seen in FIGS. 2 and 3. Each heat emitter has similar characteristics. When using two or more heat emitters, cooking times are similar to those of conventional barbecue grills. The temperature within the cooker rises to a degree consistent with the needs of quicker cooking.

Water has an infrared peak absorption point at about 2.6 microns, which is the emission peak of 1500° F. This is the approximate temperature of conventional heat sources used for broiling and grilling, and it occurs when the heat source shows a dull to bright red color. There is a second peak absorption point for water which can sometimes come into play which is 500° F. and about 5 microns. The present invention has a lower temperature heat source, which does not show color, is not absorbed (stopped) as readily by water in the meat, so does not boil off this water as fast. 1000° F. has an emission peak of about 3.6 microns.

The ability to vary the distance between food to be cooked and the heat emitters 40, together with the proper balance between temperature and heat which is provided by heat emitters 40 maximizes the flavor of the food. Specifically, the wavelength of the infrared electromagnetic energy facilitates the absorption of heat by the food so that cooking is even throughout, and, at the completion of cooking, the meat is tender on the inside and crusty on the outside, while the food flavor is maximized.

It is thus seen that the present invention provides a novel barbecue cooker. It is also seen that such a novel cooker is provided which slow cooks meat to perfection through a proper combination of heat, temperature and distance between the heat source and food, thereby duplicating the flavor of a wood-fired, pit cooker. It is further seen that such a novel cooker is provided which can also be used to cook foods fast. Many variations are apparent to those of skill in the art, and such variations are embodied within the spirit and scope of the present invention as measured by the following appended claims.

That which is claimed is:

1. A method of cooking food over a charcoal fire in a gas grill comprising the steps of:
   providing a gas grill comprising:
   a cooker bowl,
   an enclosure for said cooker bowl,
   means for supporting food within said cooker bowl comprising a plurality of support levels upon which a plurality of metal grates can be placed,
   a gas source outside said cooker bowl, and
   a heat source within said cooker bowl in communication with said gas source;
   a heat emitter positioned adjacently above said heat source;
   placing a first metal grate low in said cooker bowl upon a support level above said heat source and said heat emitter;
   distributing charcoal on said first grate low in said cooker bowl;
   placing a second metal grate a distance above said first metal grate;
   closing said cooker bowl;
   igniting said heat source to heat said heat emitter which then ignites said charcoal by emitting infrared radiation;
   turning said heat source off when said charcoal shows small amounts of color;
   placing food on said second metal grate for cooking when said charcoal shows a desired color.

* * * * *